No. 808,015. PATENTED DEC. 19, 1905.
O. J. COPPINS.
COMBINED PIE DOUGH CUTTER AND CRIMPER.
APPLICATION FILED JULY 6, 1904.

2 SHEETS—SHEET 1.

WITNESSES:
W. H. Quand
J. W. Pfister

INVENTOR:
Otto J. Coppins,
BY
Louis Bagger & Co.
Attorneys.

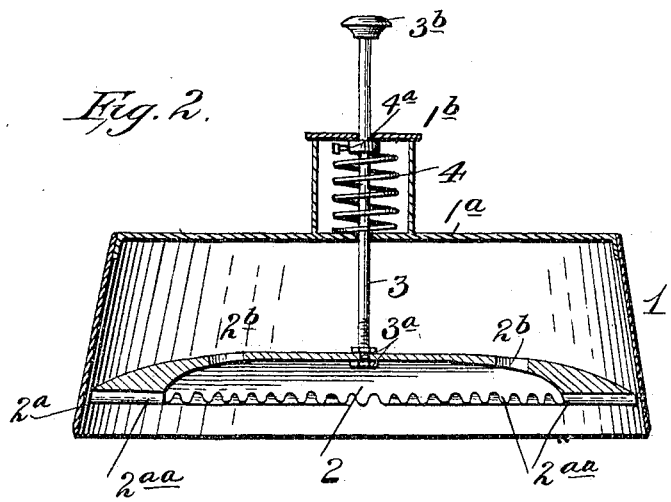
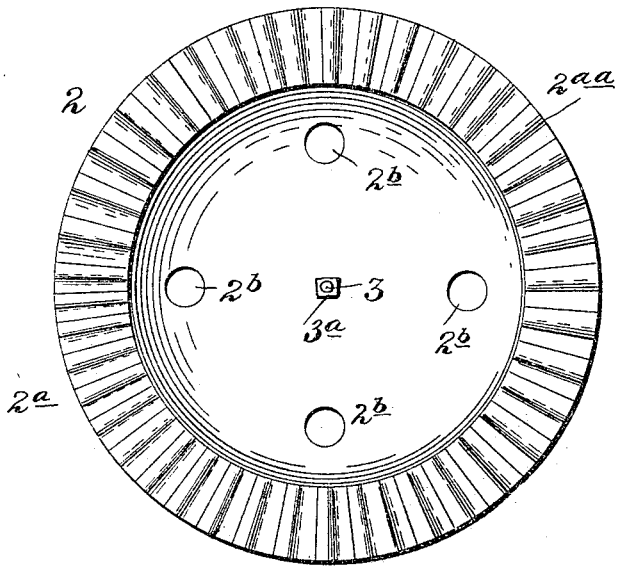

UNITED STATES PATENT OFFICE.

OTTO J. COPPINS, OF HOBART, INDIANA.

COMBINED PIE-DOUGH CUTTER AND CRIMPER.

No. 808,015.  Specification of Letters Patent.  Patented Dec. 19, 1905.

Application filed July 6, 1904. Serial No. 215,513.

*To all whom it may concern:*

Be it known that I, OTTO J. COPPINS, a citizen of the United States, residing at Hobart, in the county of Lake and State of Indiana, have invented new and useful Improvements in a Combined Pie-Dough Cutter and Crimper, of which the following is a specification.

My invention relates to improvements in what may be termed "combined dough cutters and crimpers," more especially for making pies.

Said invention has for its object to provide for the ready shaping or trimming of the dough around its marginal edges as well as not only to impress a configuration in the dough or, as usually stated, "crimp" it, but also to effectively join or seal the bottom and top members or dough sheets together at their said margins or edges and to carry out these acts in an expeditious and simple manner.

Said invention consists of certain structural features, substantially as hereinafter more fully disclosed, and specifically pointed out by the claims.

Figure 4:
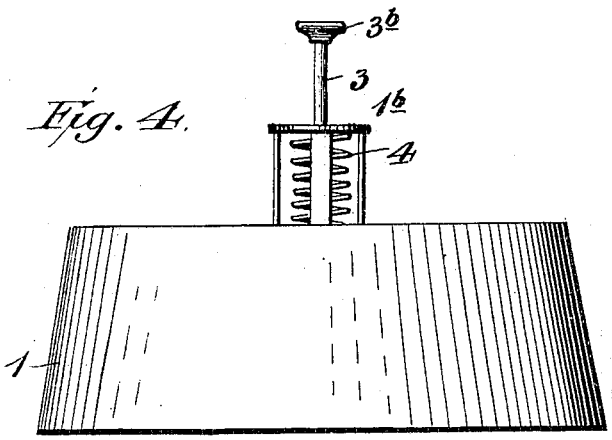
Figure 1:
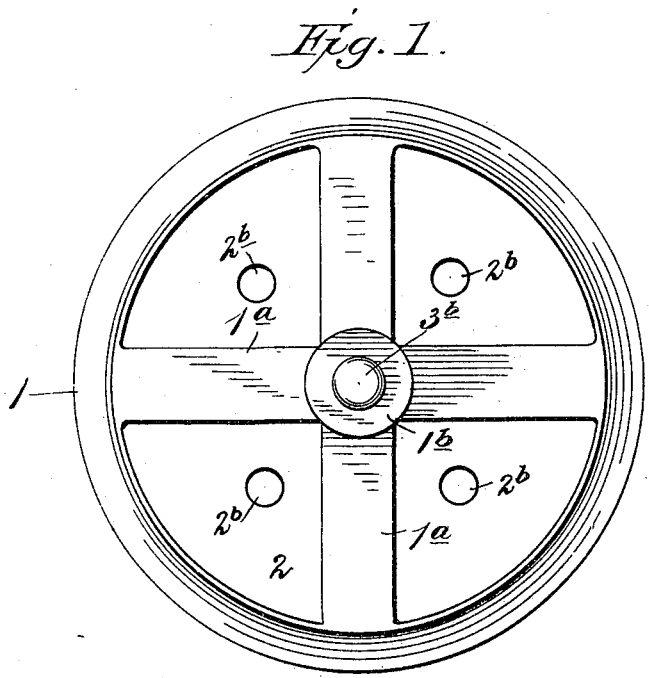

In the accompanying drawings, illustrating the preferred embodiment of my invention, Figure 1 is a plan view thereof. Fig. 2 is a sectional elevation with the crimper and sealer in its depressed or effective position. Fig. 3 is an inverted view of the device, disclosing more fully the engaging or effective surface of the crimper and sealer. Fig. 4 is a side elevation thereof.

In the carrying out of my invention I provide an outer open-topped circular cutter 1 somewhat flared downward and outward, with its bottom edge adapted to do the cutting, while to its upper edge are secured crossing braces 1$^a$ 1$^a$. Within said cutter is arranged what I term the "crimper" or "scalloper" and "sealer" 2, circular in general outline, with its effective area 2$^a$ included between concentric circles lying in the same general horizontal plane, and having an intermediary dished-upward surface, with its crimping or scalloping and sealing surfaces presented downward to act upon or impress the dough sheets, as presently disclosed, the openings 2$^b$ therein simply serving as air-vents. Said upward-dished portion or bridge, which is integral with and forms the central part of said crimper and sealer, is thickened or flared radially, with the downward presented or facing surface thereof produced in general horizontal lines, as disclosed particularly by Fig. 2, to provide an extended area requisite for the formation of the crimps or scallops, as well as to render the same effective for producing the necessary sealing action between the thicknesses or layers of dough, as in making pies. Said crimper, &c., has suitably centrally connected thereto a rod or plunger 3, the connection therebetween being preferably effected by means of jam-nuts 3$^a$, screwed upon the latter above and below the former, respectively. Said plunger or rod passes centrally up through the point of union or crossing between the braces 1$^a$ of the cutter 1 and thereabove through an upraised bearing or bridge 1$^b$, secured to said braces at said point of union, said plunger having suitably applied to its upper end a knob 3$^b$ for its convenient actuation. Said plunger has also applied thereto a spring 4, with one end bearing upon the braces 1$^a$ and its other end detachably held to said plunger by a set-screw 4$^a$ engaging the latter and forming an upper bearing for said spring. The action of said spring is to automatically restore or return the crimper 2 to its initial or elevated position after having been depressed and pressure has been removed therefrom. Said crimper or scalloper has around its margin upon the under side an annular scalloped or crimped formation 2$^{aa}$, with its effective surface 2$^a$, as above noted, presented downward and adapted to scallop or crimp the upper surface of a dough sheet, as in making especially pies and the like, and also to effectively join or seal the meeting marginal portions of the dough sheets or pastry in contradistinction to merely impressing a configuration thereinto, as ordinarily practiced in crimping or scalloping such dough sheets or pastry.

It is noted that, more particularly as in making pies, with the dough sheets and their interposed contents placed in the "tin" the cutter 1 is caused as it is passed or moved downward over the tin and its contents to trim or snugly cut off the surplus portions of said dough sheets and that after such trimming operation by suitably actuating the crimper or scalloper 2 the dough sheets will be impressed around their marginal portions with the requisite configuration or crimped surface, as well as be effectively joined or sealed together, as before noted, as necessary in properly making pies and the like pastry.

It will be understood that latitude is allowed as to details herein, as they may be changed as circumstances suggest without departing from the spirit of my invention.

I claim—

1. A device of the character described, comprising a combined pie crimper and sealer having a central upward-dished or bridge portion thickened or flared outward or radially, with the downward facing or presented surface thereof produced in general horizontal lines and equipped with an annular arrangement of scallops or crimps effective for exerting both a crimping and a sealing action, and means effective for supporting said combined crimper and sealer in normal elevated position, and for the automatic return movement thereof after the removal of pressure therefrom, as set forth.

2. A device of the character described, comprising a combined pie crimper and sealer having a central upward dished or bridge portion thickened or flared outward or radially, with the downward facing or presented surface thereof produced in general horizontal lines and equipped with an annular arrangement of crimps or scallops effective for exerting both a crimping and a sealing action, a cutter encompassing said crimper, a spring-pressed plunger-rod fixed to said bridge portion of the crimper and sealer and extending up through said cutter for actuation.

In testimony whereof I have signed my name to this specification in the presence of two subscribing witnesses.

OTTO J. COPPINS.

Witnesses:
JOSEPH H. CONROY,
A. J. SWANSON.